United States Patent Office 3,448,101
Patented June 3, 1969

3,448,101
DRY HEAT PROCESS FOR THE PREPARATION OF CATIONIC STARCH ETHERS
Jean-Marc Billy and Judith Ann Seguin, nee Martens, Montreal, Quebec, Canada, assignors to The Ogilvie Flour Mills Company, Limited, Montreal, Quebec, Canada
No Drawing. Filed Nov. 25, 1964, Ser. No. 413,984
Claims priority, application Canada, July 11, 1964, 907,061
Int. Cl. C08b *19/06;* D21h *3/20*
U.S. Cl. 260—233.3             16 Claims

---

ABSTRACT OF THE DISCLOSURE

Gelatinizable nitrogen containing cationic starch ethers in unswollen granule form are prepared by blending granular starch with a non-volatile epoxide containing a tertiary or quaternary ammonium salt group and heating the blend in essentially dry state and in the absence of catalysts at a temperature of about 200 to 300° F.

---

This invention relates to a new process for the preparation of cationic starch ethers. The term cationic describes those derivatives of starch which possess a positive charge under the conditions of use.

Several methods have been proposed heretofore for preparing cationic starches. Of these, those making use of etherifying agents containing both basic nitrogen atoms and quaternary ammonium groups are the most important. The condensation with starch is usually accomplished by dispersing the starch granules in an aqueous alkali solution and adding the etherifying agent under non-gelatinizing conditions. The use of large quantities of gelatinization inhibitors, such as sodium sulfate and sodium chloride, is required since the low level of alkali catalyst that will not disrupt the granule structure in the absence of these inhibitors is so low that the starch alkoxide ion does not form in sufficient amounts to allow the etherification to take place. In addition, even under conditions of maximum alkali hydroxide to starch ratio 0.2 mole of sodium hydroxide per mole of starch) the aqueous etherification reactions require up to 24 hours. The addition of neutral salts to repress swelling presents the obvious disadvantages of additional cost and of imposing a subsequent purification step to free the product of said salts. When the etherifying functional groups are organic halogen and epoxy groups, the water present competes with the starch hydroxyls to form the alcohol and the glycol respectively. This results in poor reaction efficiencies.

It is also well known that bifunctional etherifying agents such as epichlorohydrin react under aqueous alkali conditions with starch to give cross-linked starches. Trace amounts of these reagents will completely inhibit the swelling of the treated starch even in boiling water. It follows that such chemicals must be rigorously excluded from reactions with starch in aqueous alkali if a useful dispersible products is to be obtained.

The object of this invention is to provide a fast and practical procedure for the preparation of cationic starch ethers which circumvenes the limitations of the conventional etherification process outlined above and which are:

(1) the high cost of swelling inhibitors and catalysts;
(2) the need for rigorous exclusion of the cross-linking agents, and
(3) the necessity of long reaction periods.

It is also the object of this invention to set forth specifically the preparation of quaternary ammonium and tertiaryamino hydroxyalkyl starch ethers.

It was discovered that granular starch can be etherified by non-volatile epoxides bearing quaternary and tertiary ammonium groups and having the general formula:

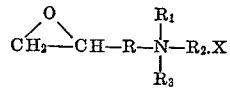

where R is an alkylene chain containing 1 to 3 carbon atoms, $R_1$ and $R_2$ are the same or different and consist of alkyl radicals or a cyclic structure formed by joining $R_1$ and $R_2$ by means of an alkylene chain which may contain an oxygen atom therein, $R_3$ is a hydrogen atom or an alkyl radical, and X is a halogen atom, with the restriction that when $R_1$, $R_2$ and $R_3$ represent alkyl radicals and are the same, each contains not more than 3 carbon atoms and when they are different and one has more than 3 carbon atoms then the other two are selected from methyl and ethyl radicals, and when $R_1$ and $R_2$ form the cyclic structure then $R_3$ is selected from hydrogen, methyl and ethyl, in a substantially dry state by the action of heat alone, and without further addition of catalysts. Briefly, the process comprises blending powdered starch with a solution of said epoxide and heating the mixture to effect substitution. This process applies particularly well to those quaternary ammonium epoxides obtained by reacting epihalohydrins with equimolar quantities of tertiary amines. Since the unreacted epihalohydrins are removed by evaporation during the initial stages of the heating cycle, there is no need to purify the crude condensate solution obtained from the amine and the epihalohydrin to remove the cross-linking agent. Water is the preferred solvent for the preparation of the amine-epihalohydrin condensate but alcoholic and mixed polar solvent systems can also be used. When water is used as solvent for the tertiary amine-epihalohydrin condensate, the moist starch blend can be directly converted to the ether by heat or it can be dried prior to the heating cycle. At moisture levels of above 8%, special ventilation must be provided over the blend during the conversion by heat in order to remove the water vapour. It is preferable however to utilize a redried powdered starch in this process to give a final blend containing not more than 8% moisture. The mobile powder thus obtained can be immediately heated in any commercial dextrinizer without extensive drying.

The temperature for etherification in this process is in the range of 200 to 300° F., the preferred range being 265–290° F. Reaction times of 30 to 45 minutes are sufficient to complete etherification. The substitution of the starch begins well below this temperature but rates are much slower at lower temperatures. Above 300° F., thermal breakdown and dextrinization accompanied by a drop in viscosity become evident. This leads to an increase in solubility and development of dark colour. Upon completion of the reaction, the dry cationic starch powder can be cooled, and packaged without further processing.

This invention lends itself extremely well to the manufacture of cold water swellable quaternary ammonium hydroxyalkyl starch ethers in granular form. Etherifications in aqueous media are limited to the preparation of low degree of substitution (usually D.S. of 0.05 or lower) derivatives because the derivatives often become soluble in the reaction media at higher degrees of substitution and high production losses are incurred. Under dry conditions however, substitutions can be carried out to give products which gelatinize in cold water, by using larger quantities of etherifying reagent. Purification of these high D.S. starch derivatives, if desired, can be conveniently accomplished by washing in aqueous alcohol solutions.

Organic halogen compounds which have an oxirane function on the same molecule, and which will quaternize with tertiary amines, are suitable for the preparation of the epoxyquaternary ammonium etherifying reagent. Epichlorohydrin is by far the most readily available in this class of chemicals and was used in the examples given. Other possible reagents are, for example, epibromohydrin, chlorobutylene oxide and chloroamylene oxide.

Any tertiary amine that will react with the above indicated organic halogen compounds to form the desired reagent is a possible starting material. The most commonly used amines are: triethyl, trimethyl, methyldiethyl, dimethylethyl, dimethylfattyalkyl, N-ethyl- and N-methyl-morpholine, N-ethyl- and N-methylpiperidine, and dimethylbenzylamine. Amines with three large alkyl groups having more than 3 carbon atoms are unsuitable because they are too unreactive.

In general there can be used tertiary amines of the formula:

wherein $R_1$, $R_2$ and $R_3$ are the same or different and consist of alkyl radicals or a cyclic structure formed by joining any two R's by means of an alkylene chain which may contain an oxygen atom therein, with the restriction that the three R's are the same each should contain not more than 3 carbon atoms and when the R's are different and one represents a carbon chain then having more than 3 carbon atoms the other two are each selected from methyl and ethyl radicals; and when two of the R's are linked together by means of an alkylene chain which may contain an oxygen atom therein, the remaining R is selected from methyl and ethyl radicals.

The dry heat etherification process applies equally well to the preparation of starch ethers bearing tertiary amine groups (instead of quaternary ammonium) as illustrated in Example VII.

The length of the blending period and the ventilating conditions during the blending and heating cycles have some effects on the properties of the finished products. Best dispersibility is obtained when adequate ventilation allows for early escape of the excess epihalohydrin. Solvent extraction of the unreacted epihalohydrin from a fresh aqueous condensate solution causes only minor changes in the swelling and cooking characteristics of the quaternary ammonium starch ethers when compared to those obtained using the crude unextracted condensate.

Cationicity of the starch is measured by subjecting a 0.2% cooked paste of the sample to a 30 volt direct current applied across two nickel electrodes covered with preweighed cotton gauze. After a holding time of one hour, the gauze is gently removed, ovendried and weighed to determine the sign and, to a certain extent, the degree of polarity. Wheat starch as well as all other natural starches show a definite migration to the anode and this migration is more pronounced at higher pH values. The quaternary ammonium ethers of starch prepared by this process all migrated to the cathode regardless of the D.S. and of the pH of the paste which was varied from 2 to 10.

The dry heat etherification process can also be performed on thin-boiling starch when lower viscosity cationic derivatives are desired. Thin-boiling cationic products are also possible by treating the regular starch ether with aqueous hydrochloric acid in the manner well known in the art.

The cationic starch ethers obtained from unmodified thick boiling starches by the process of the instant invention have high swelling power and viscosity and are particularly well suited for wet end addition during paper manufacture for effecting internal binding of the cellulose fibres, as the distinctly cationic nature of the starch ethers results in high retention of the starch binder by said fibres. The present ethers also find special application as flocculating agents and are useful wherever conventional starch products are employed.

The following examples further illustrate some embodiments of this invention but in no way limit the scope of the novel process. The examples given utilize wheat starch but apply as well to other cereal starches as well as to tuber and root starches in their original granular forms.

Example I.—Preparation of cationic starch ethers using a condensate of epichlorohydrin and triethylamine 0.1 mole of triethylamine (10.1 g.) and 0.1 mole of epichlorohydrin (9.25 g.) were added to 50 ml. of water and the mixture was agitated at room temperature for 5½ hours. The clear solution obtained was neutralized to pH 7 with 10% aqueous HCl (8.0 ml.) and blended with 368 g. of powdered wheat starch at 12% moisture, equivalent to 2 moles of anhydro glycose units (A.G.U.). The granular mass was dried to below one percent moisture, ground to a powder and heated with strong mechanical agitation from 265° F. to 295° F. over a period of 60 minutes in a covered stainless steel beaker fitted with a heating mantle. This crude product had greatly increased water absorption capacity over untreated starch and its paste in water was clear and showed no set-back on storage.

A sample of the starch ether was washed free of solubles by repeated dispersions and filtrations in 50% aqueous methanol. The yield was 95%. This material had a nitrogen content of 0.16%, equivalent to a D.S. of 0.019. Its cooking and viscosity properties are given in Table 1 along with those of the same ethers of wheat starch of different D.S. obtained by varying the amount of the etherifying crude reagent. The washed samples were used for the nitrogen determinations and the cooking experiments. All these samples were cationic while untreated wheat starch tested under similar conditions was anionic.

TABLE 1.—CATIONIC WHEAT STARCHES FROM CRUDE TRIETHYLAMINE-EPICHLOROHYDRIN CONDENSATE

| Run | Mole of Condensate per Mole A.G.U. | Nitrogen Content, Percent | D.S. | Cooking and Viscosity Data [1] | | | | |
|---|---|---|---|---|---|---|---|---|
| | | | | Solids, Percent | Gel Temp., °C. | Peak Visc., B.U. | Peak Temp., °C. | Visc. 50° C., B.U. |
| 1 | None | 0.02 | | 8 | 86 | 400 | 95 | 820 |
| 2 | 0.2 | 0.51 | 0.063 | 2 | ([2]) | 1,450 | 53 | 750 |
| 3 | 0.1 | 0.30 | 0.036 | 4 | 33.5 | 1,980 | 62 | 1,160 |
| 4 | 0.05 | 0.16 | 0.019 | 4 | 45.5 | 680 | 66.5 | 700 |
| 5 | 0.025 | 0.10 | 0.011 | 4 | 59 | 680 | 95 | 670 |
| 6 | 0.012 | 0.06 | 0.007 | 8 | 57.5 | 2,120 | 92 | |

[1] A Brabender amylograph fitted with a 700 cmg. (centimetregram) cartridge and a cooling cover and operated at 75 r.p.m. was used for obtaining the cooking and viscosity data of these runs. The pastes were automatically heated at the rate of 1.5° C. per minute to 95° C. and maintained at 95° C. for 45 minutes before cooling to 50° C. at the same rate. The viscosity was read in Brabender Units (B.U.).

[2] Room temp.

Example II.—Preparation of a cationic starch ether using a condensate of epichlorohydrin and triethylamine and redried powdered wheat starch A triethylamine-epichlorohydrin condensate was made from 4.63 g. of epichlorohydrin (0.050 mole) and 5.13 g. of triethylamine (0.056 mole) in 20 g. of water. After 5½ hours of agitation, the clear solution was taken to pH 7 with 3.6 ml. of 10% aqueous HCl and added to 418 g. (2.5 moles dry basis) of powdered wheat starch at 3% moisture. After blending 10 minutes, the mobile powder was heated with mechanical agitation in an open stainless steel beaker from room temperature to 275° F. in 105 minutes. The crude starch ether obtained had a moisture content of 0.3% and a cold water solubility of 2.33%. It gave the following cooking characteristics in the Brabender amylograph at 8% solids:

Gel temperature—72.5° C.
Peak viscosity—630 B.U. at 93.5° C.
Viscosity at 50° C.—1160 B.U.

Repeated washings in 50% aqueous methanol gave an analytical sample containing 0.13% nitrogen equivalent to a D.S. of 0.015.

Example III.—Preparation of a cationic starch ether using a consensate of epichlorohydrin and trimethylamine An aqueous solution of trimethylamine containing 0.1 mole of trimethylamine in 25.5 ml. of solution was added dropwise over 20 minutes to 0.1 mole (9.25 g.) of epichlorohydrin stirred in 30 ml. of water at room temperature. After an additional 10 minutes the clear solution obtained was neutralized to pH 7. The crude 2,3-epoxypropyl trimethyl-ammonium chloride solution was blended with 368 g. of wheat starch at 12% moisture corresponding to two moles of A.G.U. The granular mass was dried to less than one percent moisture content, pulverized to a powder and heated with agitation from 270 to 285° F. in 45 minutes. This crude product had greatly increased swelling power and clarity compared with untreated wheat starch. Kjeldahl analysis of a purified sample (three washings in 50% aqueous methanol) gave a nitrogen content of 0.27% which is equivalent to a D.S. of 0.032. Both crude and washed products give stable pastes in water which do not set to rigid gels on cooling. A 4% slurry of the purified 2-hydroxypropyl-3-trimethylammonium chloride starch ether was cooked in the Brabender amylograph under the conditions described in Table 1 and gave the following values:

Gel temperature—54.5° C.
Peak viscosity—980 B.U. at 95° C.
Viscosity at 50° C.—1120 B.U.

Example IV.—Preparation of a cationic starch ether using a condensate of epichlorohydrin and dimethyldodecylamine A mixture of 0.1 mole of dimethyldodecylamine (21.34 g.) and 0.1 mole of epichlorohydrin (9.25 g.) in 100 ml. of water was agitated at room temperature for 90 minutes. The solution was neutralized to pH 7 with 10% aqueous HCl and blended with 368 g. of powdered wheat starch containing 12% moisture (2 moles of A.G.U.). The lumpy mass obtained was dried in a forced air oven and heated to between 265 and 295° F. for 60 minutes. The buff coloured starch ether obtained was washed twice in 50% aqueous methanol. Kjeldahl nitrogen was 0.19% for a calculated D.S. of 0.023. This starch ether is hydrophobic to cold water but disperses readily on heating and gives a clear stable high viscosity paste. The Brabender amylograph characteristics of a 4% solids paste are:

Gel temperature—64° C.
Peak viscosity—670 B.U. at 86° C.
Viscosity at 50° C.—440 B.U.

Example V.—Preparation of a cationic starch ether using a condensate of epichlorohydrin and N-methylmorpholine A mixture of 0.1 mole of N-methylmorpholine (10.35 g.), 0.1 mole of epichlorohydrin (9.25 g.) and water (50 ml.) was agitated at room temperature for 60 minutes. The solution was neutralized to pH 7 and blended into 184 g. of powdered wheat starch at 12% moisture (1 mole of A.G.U.). The semi-dry mass was air dried overnight and oven dried at 100° C. to constant weight. The reaction was carried out at 268 to 285° F. for 70 minutes as described in Example I. The pure white product obtained from 50% aqueous methanol washings contained 0.34% nitrogen, equivalent to a D.S. of 0.041. A 4% solids slurry in the Brabender amylograph gave a curve that showed the following properties:

Gel temperature—51.5° C.
Peak viscosity—2270 B.U. at 86° C.
Viscosity at 50° C.—2180 B.U.

Example VI.—Preparation of a cationic starch ether using pure methyldiethyl-2,3-epoxypropylammonium iodide A freshly prepared solution of crystalline methyldiethyl-2,3-epoxypropylammonium iodine containing 13.55 g. (0.05 mole) of this compound in 50 ml. of water was blended with 184 g. of powdered wheat starch containing 12% moisture (one mole of A.G.U.). The damp mass was oven dried at 100° C. and heated as described in Example I between 275 and 285° F. for 60 minutes. A sample washed free of solubles in 50% aqueous methanol (yield: 95%) contained 0.37% nitrogen for a D.S. of 0.046. This is equal to a reaction efficiency of 92% of theory. A 4% slurry when cooked according to the conditions in Example I gave the following characteristics:

Gel temperature—51.5° C.
Peak viscosity—1220 B.U. at 78.5° C.
Viscosity at 50° C.—980 B.U.

The paste was very clear and stable, and was cationic.

Example VII.—Preparation of a cationic starch ether using diethylamino-2,3-epoxypropane hydrochloride A solution of 6.6 g. (0.05 mole) of pure diethylamino-2,3-epoxypropane in 10 ml. of water was neutralized to pH 5 with 10% aqueous HCl. This solution was then blended with 180 g. of powdered wheat starch containing 10% moisture (one mole of A.G.U.) and the mixture was dried in a forced air oven at 100° C. until free of volatiles. The blend was next heated at 265 to 285° F. for 55 minutes, cooled and washed three times in 50% aqueous methanol. The yield after washing was 95.7% based on the starch weight and the nitrogen content was 0.17%, equivalent to a D.S. of 0.020. This starch ether afforded stable pastes of higher viscosity when compared with the parent wheat starch and migrated to the cathode in the electrolytic test.

Example VIII.—Preparation of a thin-boiling cationic starch ether using a condensate of epichlorohydrin and triethylamine and thin-boiling starch Two moles of thin-boiling, 80-fluidity wheat starch were substituted for the unmodified starch in Example I. The yield after washing in 50% aqueous methanol was 93.5% of a white starch ether containing 0.13% nitrogen which is equivalent to a D.S. of 0.015. An 8% slurry in the Brabender amylograph gave the following properties:

Gel temperature—53° C.
Peak viscosity—430 B.U. at 60° C.
Viscosity at 50° C.—150 B.U.

Example IX.—Acid thinning of a crude cationic starch ether

Two moles of crude cationic wheat starch obtained as described in run 4 of Example I were stirred for 22 hours at 40° C. in 500 ml. of 0.2N HCl. After neutralization to a pH of 6.3, the suspension was filtered by suction and the residue washed further by repeated redispersions in water followed by filtrations. This product had a nitrogen content of 0.12% equal to a D.S. of 0.014 and was cationic. An 8% solids slurry in the Brabender amylograph gave the following properties:

Gel temperature—53° C.
Peak viscosity—180 B.U. at 62° C.
Viscosity at 50° C.—45 B.U.

We claim:

1. A process for preparing gelatinizable nitrogen containing cationic starch ethers in unswollen granule form which comprises blending granular starch with a non-volatile epoxide containing a tertiary or quaternary ammonium salt group and having the general formula:

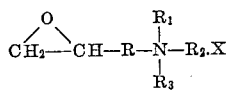

where R is an alkylene chain containing 1 to 3 carbon atoms, $R_1$ and $R_2$ are the same or different and consist of alkyl radicals or a cyclic structure formed by joining $R_1$ and $R_2$ by means of an alkylene chain which may contain an oxygen atom therein, $R_3$ is a hydrogen atom or an alkyl radical, and X is a halogen atom, with the restriction that when $R_1$, $R_2$ and $R_3$ represent alkyl radicals and are the same, each contains not more than 3 carbon atoms and when they are different and one has more than 3 carbon atoms then the other two are selected from methyl and ethyl radicals, and when $R_1$ and $R_2$ form the cyclic structure then $R_3$ is selected from hydrogen, methyl and ethyl and heating the blend in essentially dry state and in the absence of catalysts at a temperature of about 200 to 300° F.

2. A process for preparing gelatinizable nitrogen containing cationic starch ethers in unswollen granule form which comprises blending granular starch with a non-volatile epoxide containing a quaternary ammonium salt group and having the general formula:

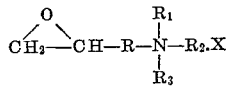

where R is an alkylene chain containing 1 to 3 carbon atoms, $R_1$, $R_2$ and $R_3$ are the same or different and consist of alkyl radicals or a cyclic structure formed by joining any two of them by means of an alkylene chain which may contain an oxygen atom therein; with the restriction that when $R_1$, $R_2$ and $R_3$ are the same each contains not more than 3 carbon atoms and when they are different and one represents a carbon chain having more than 3 carbon atoms then the other two are each selected from methyl and ethyl radicals, and when two of them form the cyclic structure then the remaining one is selected from methyl and ethyl radicals, and heating the blend in essentially dry state and in the absence of catalysts at a temperature of about 200 to 300° F.

3. A process according to claim 2, in which the epoxide is a crude condensation product of epichlorohydrin, epibromohydrin, chlorobutylene oxide or chloroamylene oxide with substantially equimolar amount of a tertiary amine of the general formula:

wherein $R_1$, $R_2$ and $R_3$ are the same or different and consist of alkyl radicals or a cyclic structure formed by joining any two R's by means of an alkylene chain which may contain an oxygen atom therein; with the restriction that when the three R's are the same each contains not more than 3 carbon atoms and when the R's are different and one represents a carbon chain having more than 3 carbon atoms then the other two are each selected from methyl and ethyl radicals, and when two of the R's are linked together by means of an alkylene chain which may contain an oxygen atom therein, the remaining R is selected from methyl and ethyl radicals, the condensation being carried out in aqueous solution and followed by neutralization to pH 7.

4. A process according to claim 2, in which the epoxide is a crude condensation product of epichlorohydrin with a tertiary amine selected from the group consisting of triethylamine, trimethylamine, methyldiethylamine, dimethylethylamine, N-ethylmorpholine, N-methylmorpholine, N-ethylpiperidine, N-methylpiperidine and dimethylbenzylamine.

5. A process according to claim 2, in which the epoxide is a crude condensation product of epichlorohydrin with dimethyldodecylamine.

6. A process for preparing gelatinizable nitrogen containing cationic starch ethers in unswollen granule form which comprises mixing granular starch with a solution of dimethyl-2,3-epoxypropylamine hydrochloride, diethyl-2,3-epoxypropylamine hydrochloride or methyldiethyl-2,3-epoxy-propylammonium iodide, heating the blend to remove the solvent and then heating said blend in essentially dry state and in the absence of catalysts at a temperature of about 200 to 300° F. to effect etherification of the starch.

7. A process as claimed in claim 1, in which the blend is heated at a temperature in the range of 200 to 300° F. for a period of about 30 to 45 minutes to effect etherification of the starch.

8. A process as claimed in claim 2, in which the blend is heated at a temperature in the range of 200 to 300° F. for a period of about 30 to 45 minutes to effect etherification of the starch.

9. A process as claimed in claim 1, in which the blend is heated to a temperature in the range of 265 to 290° F. to effect etherification of the starch.

10. A process as claimed in claim 2, in which the blend is heated to a temperature in the range of 265 to 290° F. to effect etherification of the starch.

11. A process as claimed in claim 1, in which the epoxide is in solution in water which is subsequently removed by heating.

12. A process as claimed in claim 2, in which the epoxide is in solution in water which is subsequently removed by heating.

13. A process as claimed in claim 1, in which the starch is selected from cereal starches, tuber starches and root starches in their original granular form.

14. A process as claimed in claim 2, in which the starch is selected from cereal starches, tuber starches and root starches in their original granular form.

15. A process as claimed in claim 1, in which the epoxide/starch ratio employed is about 0.012–0.2 mole/mole.

16. A process as claimed in claim 2, in which the epoxide/starch ratio employed is about 0.012–0.2 mole/mole.

References Cited

UNITED STATES PATENTS

| | | | |
|---|---|---|---|
| 3,219,518 | 11/1965 | Barber et al. | 162—175 |
| 3,017,294 | 1/1962 | Meisel | 260—233.3 |
| 2,995,513 | 9/1961 | Paschall et al. | 260—233.3 |
| 2,876,217 | 3/1959 | Paschall | 260—233.3 |

OTHER REFERENCES

Preparations of amine derivatives of polyvinyl alcohol and starch, Academie Des Sciences Comptes Rendus, vol., 246, pp. 1425–26 (1958).

HOSEA E. TAYLOR, JR., *Primary Examiner.*

R. W. MULCAHY, *Assistant Examiner.*

U.S. Cl. X.R.

162—175